United States Patent [19]

Nakagawa

[11] Patent Number: 5,707,601
[45] Date of Patent: Jan. 13, 1998

[54] PROCESS FOR PREPARING ZEOLITES HAVING MTT CRYSTAL STRUCTURE USING SMALL, NEUTRAL AMINES

[75] Inventor: Yumi Nakagawa, Oakland, Calif.

[73] Assignee: Chevron U.S.A. Inc., San Francisco, Calif.

[21] Appl. No.: 610,537

[22] Filed: Mar. 4, 1996

Related U.S. Application Data

[63] Continuation-in-part of Ser. No. 407,129, Mar. 17, 1995, abandoned.

[51] Int. Cl.$^6$ .................. C01B 39/04; B01J 29/06
[52] U.S. Cl. .................. 423/701; 423/702; 423/703; 423/704; 423/705; 423/706; 423/707; 423/708; 423/DIG. 36; 423/718; 502/62
[58] Field of Search .................. 423/701, 702, 423/703, 704, 705, 706, 707, 708, DIG. 36, 718; 502/62

[56] References Cited

U.S. PATENT DOCUMENTS

| | | |
|---|---|---|
| 4,076,842 | 2/1978 | Plank et al. . |
| 4,151,189 | 4/1979 | Rubin et al. . |
| 4,205,053 | 5/1980 | Rollmann et al. . |
| 4,296,083 | 10/1981 | Rollmann . |
| 4,337,176 | 6/1982 | Boersman et al. . |
| 4,377,502 | 3/1983 | Klotz . |
| 4,483,835 | 11/1984 | Zones . |
| 4,661,467 | 4/1987 | Kuehl ..................... 502/202 |
| 5,053,373 | 10/1991 | Zones ..................... 502/64 |
| 5,063,038 | 11/1991 | Kirker et al. . |
| 5,173,281 | 12/1992 | Chang et al. ............. 423/702 |
| 5,252,527 | 10/1993 | Zones et al. ............. 502/64 |
| 5,376,260 | 12/1994 | Santilli et al. ........... 208/111 |

FOREIGN PATENT DOCUMENTS 2190910  12/1987  United Kingdom .

OTHER PUBLICATIONS

Zeolites, vol. 3, No. 1, 1 Jan. 1983, pp. 8–11, XP000573609, Parker L.M. and Bibby D.M.: "Synthesis and some properties of two novel zeolites, KZ–1 and KZ–2" (see the whole document) Jan. 1983.

Database WPI, Section Ch, Week 8616, Derwent Publications Ltd., London, GB; Class E14, AN 86–103240, XP002006880 & JP,A,61 047 425 (Sumitomo Chem Ind KK), 7 Mar. 1986 (see abstract).

*Primary Examiner*—Mark L. Bell
*Assistant Examiner*—Louis M. Troilo
*Attorney, Agent, or Firm*—R. J. Sheridan

[57] ABSTRACT

The present invention relates to a process for preparing zeolites having the MTT crystal structure, such as zeolites SSZ-32 and ZSM-23, using small, neutral amines capable of forming the zeolite, the amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom (such as isobutylamine, diisobutylamine, diisopropylamine or trimethylamine), wherein the process is conducted in the absence of a quaternary ammonium compound.

52 Claims, No Drawings

PROCESS FOR PREPARING ZEOLITES HAVING MTT CRYSTAL STRUCTURE USING SMALL, NEUTRAL AMINES

This application is a continuation-in-part of application Ser. No. 08/407,129, filed Mar. 17, 1995, now abandoned.

BACKGROUND OF THE INVENTION

1. Field of the Invention

The present invention relates to a process for preparing zeolites having the crystal structure designated "MTT" using small, neutral amines such as isobutylamine, diisobutylamine, diisopropylamine and trimethylamine.

2. State of the Art

Zeolites having the crystal structure designated "MTT" are known. For example, the zeolite designated "SSZ-32" and methods for making it are disclosed in U.S. Pat. No. 5,053,373, issued Oct. 1, 1991 to Zones. This patent discloses the preparation of zeolite SSZ-32 using an N-lower alkyl-N'-isopropylimidazolium cation as an organic templating agent. U.S. Pat. No. 4,076,842, issued Feb. 28, 1978 to Plank et al., discloses the preparation of the zeolite designated "ZSM-23", a zeolite with a structure similar to SSZ-32, using a cation derived from pyrrolidine as the template. Zeolites SSZ-32 and ZSM-23 are commonly referred to as having the MTT crystal structure or connectivity of atoms. Both of the aforementioned patents are incorporated herein by reference in their entirety.

U.S. Pat. No. 4,205,053, issued May 27, 1980 to Rollmann et al., discloses a process for manufacturing zeolites such as medium pore size, multidimensional ZSM-5 in which the shape or some other feature of the microscopic crystals is controlled by including in the forming solution an organic basic nitrogen compound in addition to an organic nitrogenous template. Examples of the basic nitrogen compound include amines such as tributylamine, trimethylamine, diisobutylamine, cyclohexylamine, isobutylamine, diisopropylamine, cycloheptylamine, n-octylamine, triethylamine, tert-octylamine, piperidine and piperazine.

Copending U.S. patent application Ser. No. 08/407,432, filed Mar. 17, 1995 of S. I. Zones and Y. Nakagawa entitled "Preparation of Zeolites Using Organic Template and Amine" discloses that zeolites, including medium pore size, unidimensional zeolites, can be prepared using a mixture of an amine component comprising (1) at least one amine containing one to eight carbon atoms, ammonium hydroxide, and mixtures thereof, and (2) an organic templating compound capable of forming the zeolite in the presence of the amine component, wherein the amine is smaller than the organic templating compound. Examples of the amines include isopropylamine, isobutylamine, n-butylamine, piperidine, 4-methylpiperidine, cyclohexylamine, 1,1,3,3-tetramethylbutylamine and cyclopentylamine and mixtures of such amines.

It has now been found that zeolites having the MTT crystal structure, such as SSZ-32 and ZSM-23, can be prepared using small, neutral amines capable of forming the zeolite such as isobutylamine, diisobutylamine, diisopropylamine and trimethylamine alone instead of the previously used organic templating agents or mixtures of organic templating agents and smaller amines.

SUMMARY OF THE INVENTION

In accordance with the present invention, there is provided a process for preparing a zeolite having, after calcination, the X-ray diffraction lines of Table I, said process comprising:

(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) at least one small, neutral amine capable of forming said zeolite, said amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom;

(b) maintaining the aqueous solution under conditions sufficient to form crystals of the zeolite; and (c) recovering the crystals of the zeolite, wherein said process is conducted in the absence of a quaternary ammonium compound.

In a preferred embodiment, the present invention provides said process which is performed in the absence of any nitrogen-containing organic templating agent other than the small, neutral amines of this invention. In another preferred embodiment of the present invention, the small, neutral amine of this invention is selected from the group consisting of isobutylamine, diisobutylamine, diisopropylamine and trimethylamine.

The present invention also provides this process further comprising replacing alkali and/or alkaline earth metal cations of the recovered zeolite, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

The present invention also provides a zeolite composition, as-synthesized and in the anhydrous state, having the X-ray diffraction lines of Table II and whose general composition, in terms of mole ratios, is as follows:

| | |
|---|---|
| $YO_2/W_2O_3$ | $\geq 15$ |
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is at least one small, neutral amine capable of forming said zeolite, said amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom (such as isobutylamine, diisobutylamine, diisopropylamine or trimethylamine); M is an alkali metal cation, alkaline earth metal cation or mixtures thereof; and n is the valence of M (i.e., 1 or 2), wherein said composition does not contain a quaternary ammonium compound.

The present invention also provides a preferred embodiment of this composition wherein said composition does not contain any nitrogen-containing organic templating agent other than the small, neutral amines of this invention. In another preferred embodiment of the present invention, the small, neutral amine of this invention is selected from the group consisting of isobutylamine, diisobutylamine, diisopropylamine and trimethylamine.

Among other factors, the present invention is based on the discovery that zeolites having the MTT crystal structure, e.g., SSZ-32 and ZSM-23, can be made using the small, neutral amines of this invention, such as isobutylamine, diisobutylamine, diisopropylamine and trimethylamine. It is particularly surprising that no other organic template (for example, a small amount of quaternary ammonium cation) is needed to induce the crystallization of the SSZ-32 zeolite. It is also surprising that zeolitic materials with silicon oxide to aluminum oxide molar ratios on the order of 15 or greater can be prepared with these neutral amines.

Use of the small, neutral amine in the present invention provides several advantages. For example, the small, neutral amines are inexpensive compared to previously used organic templating agents. These amines are also easy to remove from the channel system of the product, and are potentially recyclable. In addition, they are very selective for making zeolites having the MTT crystal structure (i.e., they can form zeolites having the MTT crystal structure in preference to other zeolites, such as ZSM-5), and result in formation of a product having very small crystallites which exhibit performance advantages. It has also been observed that the rate of crystallization of the product zeolite using this method is very fast.

DETAILED DESCRIPTION OF PREFERRED EMBODIMENTS

The present invention will now be described in more detail by reference primarily to the preparation of zeolite SSZ-32. It should be understood, however, that the present invention encompasses all zeolites having the MTT structure or connectivity, including SSZ-32 and ZSM-23.

The present invention comprises:

(a) preparing an aqueous solution from sources of oxides capable of forming zeolite SSZ-32 and at least one small, neutral amine capable of forming said zeolite, said amine containing (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom (such as isobutylamine, diisobutylamine, diisopropylamine or trimethylamine);

(b) maintaining the aqueous solution under conditions sufficient to form crystals of the zeolite; and (c) recovering the crystals of the zeolite, wherein said process is conducted in the absence of a quaternary ammonium compound.

While not wishing to be bound or limited by any theory, it is believed that the small, neutral amines of this invention act as a templating agent in the reaction which forms the SSZ-32 zeolite. This is particularly surprising in view of the fact that the organic templating agents previously used to prepare SSZ-32 typically contain at least one quaternary ammonium atom in their structure, whereas the small, neutral amines used in the process of this invention do not.

The process of the present invention comprises forming a reaction mixture from sources of alkali and/or alkaline earth metal (M) cations with valences n (i.e., 1 or 2); sources of an oxide of aluminum, iron, gallium, indium, titanium, or mixtures thereof (W); sources of an oxide of silicon, germanium or mixtures thereof (Y); at least one small, neutral amine of this invention (Q); and water, said reaction mixture having a composition in terms of mole ratios within the following ranges:

| Reactants | General | Preferred |
|---|---|---|
| $YO_2/W_2O_3$ | 15–100 | 25–50 |
| $OH^-/YO_2$ | 0.10–0.40 | 0.15–0.30 |
| $Q/YO_2$ | 0.05–0.50 | 0.10–0.30 |
| $M_{2/n}/YO_2$ | 0.05–0.40 | 0.075–0.30 |
| $H_2O/YO_2$ | 10–70 | 25–50 |

Embodiments of the process of this invention include reaction mixtures in which the $YO_2/W_2O_3$ mole ratio is from about 20 to about 80; from about 20 to less than 40; 40 or more; and from 40 to about 80.

Typical sources of aluminum oxide for the reaction mixture include aluminates, alumina, hydrated aluminum hydroxides, and aluminum compounds such as $AlCl_3$ and $Al_2(SO_4)_3$. Typical sources of silicon oxide include silica hydrogel, silicic acid, colloidal silica, tetraalkyl orthosilicates, silica hydroxides, and fumed silicas. Gallium, iron, and germanium can be added in forms corresponding to their aluminum and silicon counterparts. Trivalent elements stabilized on silica colloids are also useful reagents.

The small, neutral amines useful in the practice of this invention are those which are capable of forming the desired zeolite (i.e., one having the MTT structure or connectivity) and which contain (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom. It is preferred that the small amine not be a linear amine or heterocyclic, i.e., that the nitrogen atom not form part of a ring. The small, neutral amines of this invention may be represented by the following formula:

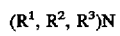

$(R^1, R^2, R^3)N$ wherein the amine contains only carbon, hydrogen and nitrogen atoms; $R^1$, $R^2$, and $R^3$ are H or $C_1$-$C_4$ alkyl groups, provided that at least one of $R^1$, $R^2$, and $R^3$ is alkyl; the amine contains a total of about three to about eight carbon atoms; and the amine contains a tertiary nitrogen atom, at least one tertiary carbon atom, or a nitrogen atom bonded directly to at least one secondary carbon atom. Preferably, when $R^1$, $R^2$, or $R^3$ is an alkyl group having more than two carbon atoms, it is a branched chain alkyl group, such as isopropyl or isobutyl.

As used herein the term "small" refers to the fact that the amine has a total of three to about eight carbon atoms, and the term "neutral" refers to the fact that the nitrogen atom does not have a positive charge. While some protonation of the amine may occur in solution, it should be emphasized that (1) the nitrogen atom of the amine does not have a positive charge when in neat form, and (2) the amine does not contain a quaternary ammonium atom, i.e., does not contain a nitrogen atom bonded to four organic (non-hydrogen) groups. Also, the amines useful in this invention are not considered to be linear amines, i.e., they contain some branching in their structure (as opposed to a linear amine such as butylamine).

In preparing zeolite SSZ-32 in accordance with the present invention, the reactants and the small, neutral amine of this invention are dissolved in water and the resulting reaction mixture is maintained at an elevated temperature until crystals are formed. The temperatures during the hydrothermal crystallization step are typically maintained from about 100° C. to about 250° C., preferably from about 140° C. to about 200° C. The crystallization period is typically two days, and generally about one day to about seven days. Preferably the crystallization period is about 72 hours or less, e.g., from about 24 to about 72 hours.

The hydrothermal crystallization is usually conducted under pressure and usually in an autoclave so that the reaction mixture is subject to autogenous pressure. The reaction mixture should be stirred during crystallization.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals of the desired zeolite both to direct, and accelerate the crystallization, as well as to minimize the formation of any undesired crystalline phases. When seed crystals are used, typically about 0.5% to about 5.0% (based on the weight of silica used in the reaction mixture) of the seed crystals of the desired zeolite are added.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

The as-synthesized zeolite product made by the process of this invention has the X-ray diffraction lines of Table II and an as-synthesized composition comprising, in terms of mole ratios in the anhydrous state, the following:

| | |
|---|---|
| $YO_2/W_2O_3$ | $\geq 15$ |
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is at least one small, neutral amine of this invention; M is an alkali metal cation, alkaline earth metal cation or mixtures thereof; and n is the valence of M, wherein said composition does not contain a quaternary ammonium compound. Preferably, Y is silicon, W is aluminum, M is potassium, and Q is isobutylamine. It is preferred that the $YO_2/W_2O_3$ ratio be from about 20 to about 80. In one embodiment of this invention, the $YO_2/W_2O_3$ ratio is from about 20 to less than 40, and in another embodiment this ratio is greater than 40, e.g., from 40 to about 80.

Typically, the zeolite is thermally treated (calcined) prior to use as a catalyst. One advantage of the present invention is that the small, neutral amines of this invention are easily removed from the channels of the zeolite and require less severe calcination conditions than those required for calcination of the typically used charged quaternary ammonium organic templates.

Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica/alumina mole ratio. The zeolite can also be steamed; steaming helps stabilize the crystalline lattice to attack from acids. The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired. Typical replacing cations can include hydrogen and hydrogen precursors, rare earth metals, and metals from Groups IIA, IIIA, IVA, IB, IIB, IIIB, IVB, VIB, and VIII of the Periodic Table of Elements. Of the replacing cations, hydrogen and cations of metals such as rare earth, Mn, Ca, Mg, Zn, Cd, Pt, Pd, Ni, Co, Ti, Al, Sn, Ga, In and Fe are particularly preferred.

The zeolite products were identified by their X-ray diffraction (XRD) pattern. The X-ray powder diffraction patterns were determined by standard techniques. The radiation was the K-alpha/doublet of copper. A scintillation counter spectrometer with a strip-chart pen recorder was used. The peak heights I and the positions, as a function of 2P where P is the Bragg angle, were read from the relative intensities, $100 \times I/I_o$ where $I_o$ is the intensity of the strongest line or peak, and d, the interplanar spacing in Angstroms corresponding to the recorded lines, can be calculated.

The X-ray diffraction pattern of Table I is representative of a calcined zeolite having the MTT crystal structure (in this case SSZ-32) made in accordance with this invention. Minor variations in the diffraction pattern can result from variations in the silica-to-alumina mole ratio of the particular sample due to changes in lattice constants. In addition, sufficiently small crystals will affect the shape and intensity of peaks, leading to significant peak broadening. The variation in the scattering angle (two theta) measurements, due to instrument error and to differences between individual samples, is estimated at +/–0.20 degrees.

TABLE I

CALCINED MTT ZEOLITE (MADE USING ISOBUTYLAMINE)

| 2Theta | d | Rel I[a] |
|---|---|---|
| 7.90[b] | 11.18 | VS |
| 8.12[b] | 10.88 | VS |
| 8.86 | 9.97 | M |
| 11.38 | 7.76 | S |
| 14.60 | 6.06 | W |
| 15.86 | 5.58 | W |
| 16.32 | 5.43 | W |
| 18.12 | 4.89 | W |
| 19.72 | 4.50 | VS |
| 20.96 | 4.24 | VS |
| 22.86 | 3.89 | VS |
| 24.02 | 3.70 | VS |
| 24.62 | 3.61 | S–VS |
| 25.28 | 3.52 | M |
| 25.98 | 3.43 | S |
| 28.26 | 3.16 | W |
| 31.60 | 2.83 | W |
| 35.52 | 2.52 | S |

[a] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.
[b] These two peaks may have significant overlap, and are sometimes treated as a single peak.

Table IA below shows an X-ray diffraction pattern representative of a calcined MTT zeolite (SSZ-32) made in accordance with this invention. In Table IA, the intensity (I) of the peaks or lines is expressed as the intensity relative to the strongest peak or line in the pattern, i.e., $I/I_o \times 100$ where $I_o$ is the intensity of the strongest peak or line.

TABLE IA

CALCINED MTT ZEOLITE (MADE USING ISOBUTYLAMINE)

| 2Theta | d | I/I₀ × 100 |
|---|---|---|
| 7.90[b] | 11.18 | 71.8 |
| 8.12[b] | 10.88 | 86.1 |
| 8.86 | 9.97 | 32.6 |
| 11.38 | 7.76 | 49.3 |
| 14.60 | 6.06 | 6.4 |
| 15.86 | 5.58 | 11.4 |
| 16.32 | 5.43 | 14.6 |
| 18.12 | 4.89 | 10.2 |
| 19.72 | 4.50 | 100.0 |
| 20.96 | 4.24 | 73.9 |
| 22.86 | 3.89 | 92.1 |
| 24.02 | 3.70 | 92.1 |
| 24.62 | 3.61 | 65.4 |
| 25.28 | 3.52 | 35.7 |
| 25.98 | 3.43 | 46.0 |
| 28.26 | 3.16 | 13.3 |
| 31.60 | 2.83 | 16.2 |
| 35.52 | 2.52 | 50.4 |

[b]These two peaks may have significant overlap, and are sometimes treated as a single peak.

The X-ray diffraction pattern of Table II shows the major peaks of an as-synthesized zeolite having the MTT crystal structure (in this case SSZ-32), in the anhydrous state, made in accordance with this invention.

TABLE II

AS SYNTHESIZED MTT ZEOLITE (MADE USING ISOBUTYLAMINE)

| 2Theta | d | Rel I |
|---|---|---|
| 8.19[c] | 10.79 | S |
| 8.95 | 9.87 | M |
| 11.42 | 7.74 | M |
| 16.41 | 5.40 | W |
| 18.20 | 4.87 | W |
| 19.76 | 4.49 | VS |
| 21.01 | 4.22 | VS |
| 22.94 | 3.87 | VS |
| 24.09 | 3.69 | VS |
| 24.70 | 3.60 | S |
| 26.05 | 3.42 | S |
| 35.57 | 2.52 | S |

[c]Quite likely two peaks overlapped.

Table IIA below shows the major peaks of a typical X-ray diffraction pattern for as-synthesized MTT zeolite made in accordance with this invention, including the relative intensities of the peaks or lines.

TABLE IIA

AS-SYNTHESIZED MTT ZEOLITE (MADE USING ISOBUTYLAMINE)

| 2Theta | d | I/I₀ × 100 |
|---|---|---|
| 8.19[c] | 10.79 | 56.3 |
| 8.95 | 9.87 | 23.9 |
| 11.42 | 7.74 | 35.4 |
| 16.41 | 5.40 | 9.5 |
| 18.20 | 4.87 | 13.0 |
| 19.76 | 4.49 | 100.0 |
| 21.01 | 4.22 | 85.6 |
| 22.94 | 3.87 | 95.7 |
| 24.09 | 3.69 | 80.3 |
| 24.70 | 3.60 | 60.9 |
| 26.05 | 3.42 | 49.9 |
| 35.57 | 2.52 | 48.9 |

[c]Quite likely two peaks overlapped.

Calcination can also result in changes in the intensities of the peaks as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

When the zeolite having the MTT crystal structure made in accordance with this invention is SSZ-32, it will typically have a Constraint Index (C.I.), as defined in J. Catalysis 67, page 218, which is incorporated by reference herein, after calcination and in the hydrogen form of 13 or greater (e.g., 13 to about 20), preferably about 18 or greater (e.g., 18 to about 20), most preferably about 20. C.I. is also disclosed in U.S. Pat. No. 4,481,177, which is also incorporated by reference herein.

The zeolites prepared by the present process are useful in hydrocarbon conversion reactions. Hydrocarbon conversion reactions are chemical and catalytic processes in which carbon-containing compounds are changed to different carbon-containing compounds. Examples of hydrocarbon conversion reactions include catalytic cracking, hydrocracking, dewaxing, alkylation, isomerization, olefin and aromatics formation reactions, and aromatics isomerization and disproportionation.

The following examples demonstrate, but do not limit, the present invention.

EXAMPLES

There are numerous variations on the embodiments of the present invention illustrated in the Examples which are possible in light of the teachings supporting the present invention. It is therefore understood that within the scope of the following claims, the invention may be practiced otherwise than as specifically described or exemplified.

Example 1

Preparation of SSZ-32 Using Isobutylamine and 2.5 Wt % Seed Crystals

In a 23 ml Teflon cup for a Parr 4745 reactor were added 3.0 ml of a 1.0N KOH solution, 6.3 grams of water, and 0.088 gram of Reheis F2000 hydrated alumina. After all the solids had dissolved, 2.25 grams of Nyacol 2040-NH₄ colloidal silica was added, followed by 0.22 gram of isobutylamine and 0.022 gram of SSZ-32 seeds. The reactor was closed and heated at 170° C. in a Blue M oven while tumbling at 43 rpm for seven days. The resulting solids were collected by filtration and determined by X-ray diffraction ("XRD") to be SSZ-32. The XRD pattern had broad lines, indicative of small crystallites.

Example 2

Preparation of SSZ-32 Using Isobutylamine and 5.0 Wt % Seed Crystals

The procedure of Example 1 was repeated, with the exception that 0.045 gram of SSZ-32 seeds was used. After seven days at 170° C., the product was isolated and determined to be SSZ-32 with a minor amount of Cristobalite.

Example 3

Preparation of SSZ-32 Using Isobutylamine and 3.0 Wt % Seed Crystals

One hundred forty grams of potassium hydroxide (87.2%) were dissolved in 5834 grams of water. Reheis F2000 hydrated alumina (57.3 grams) was added and the mixture was stirred to dissolve all the solids. Nyacol 2040-NH$_4$ colloidal silica (1634.2 grams) was then added, followed by 19.6 grams of SSZ-32 seed crystals. The resulting mixture was stirred as 270.3 ml of isobutylamine was added to the reaction liner. The liner was transferred to a 5-gallon autoclave which was heated to 170° C. and stirred at a rate of 75 rpm. After 48 hours, the product was filtered, washed with water, dried and determined to be SSZ-32. The product's SiO$_2$/Al$_2$O$_3$ mole ratio was found to be 31.

Example 4

Preparation of SSZ-32 Using Isobutylamine With No Seed Crystals

Five hundred forty-four ml of 1.0N KOH solution was mixed with 918.8 grams of water and 14.3 grams of Reheis F2000 hydrated alumina. The resulting mixture was stirred until all the solids had dissolved, and then 408.5 grams of Nyacol 2040-NH$_4$ colloidal silica was added, followed by 67.6 ml of isobutylamine. The reaction liner was transferred to a 1-gallon autoclave which was heated to 170° C. and stirred at a rate of 150 rpm. After 60 hours, the resulting product was isolated and determined by XRD to be SSZ-32 with a trace amount of Cristobalite.

Example 5

Preparation of SSZ-32 Using Trimethylamine and 5 Wt % Seed Crystals

In a 23 ml Teflon cup for a Parr 4745 reactor were added 0.75 gram of a 25% aqueous solution of trimethylamine, 2.88 ml of a 1.0N KOH solution, 0.085 gram of Reheis F2000 hydrated alumina and 7.5 grams of water. After the solids dissolved, 0.89 gram of Cabosil M-5 fumed silica was added, followed by 0.045 gram of SSZ-32 seed crystals. After 12 days at 170° C. and 43 rpm, the resulting product was isolated and determined to be SSZ-32.

Example 6

Preparation of SSZ-32 Using Diisobutylamine and 3.0 Wt % Seed Crystals

The procedure described in Example 4 was repeated with the following changes: 118.75 ml of diisobutylamine was used instead of isobutylamine, and 4.90 grams of SSZ-32 seed crystals was used. After stirring at 150 rpm at 170° C. for 49 hours, the resulting product was isolated and determined by XRD to be SSZ-32. The SiO$_2$/Al$_2$O$_3$ mole ratio of the product was 34.

Example 7

Preparation of SSZ-32 Using Diisopropylamine and 5 Wt % Seed Crystals

In a Teflon liner for a Parr 1-liter autoclave were added 70.6 ml of a 1.0N KOH solution, 209.4 grams of water, and 2.06 grams of Reheis F2000 hydrated alumina. The mixture was stirred until all the solids dissolved, then 21.8 grams of Cabosil M-5 fumed silica was added. Again, the mixture was stirred to dissolve the solids, and 9.9 ml of diisopropylamine was added, followed by 1.06 grams of SSZ-32 seed crystals. The resulting mixture was heated to 170° C. and stirred at 150 rpm for six days. The resulting product was isolated and determined to be SSZ-32 with a minor amount of unknown material.

Example 8

Preparation of ZSM-23 Using Isobutylamine

The procedure described in Example 1 was repeated except that only 0.044 gram of Reheis F2000 hydrated alumina was used, giving a starting SiO$_2$/Al$_2$O$_3$ mole ratio of 67. In addition, 0.04 gram of SSZ-32 seed crystals was used. After three days at 170° C. at 43 rpm, the resulting product was isolated and determined to be ZSM-23 with a trace amount of Cristobalite.

Comparative Example A

Preparation of ZSM-5 Using Cylopentylamine

In a 23 ml Teflon cup for a Parr 4745 reactor were added 2.88 ml of a 1.0N KOH solution, 0.085 gram of Reheis F2000 hydrated alumina and 7.5 grams of water. After the solids were dissolved, 0.89 gram of Cabosil M-5 fumed silica was added, followed by 0.005 gram of SSZ-32 seed crystals and 0.256 gram of cyclopentylamine. After 11 days at 170° C. and 43 rpm, the resulting product was isolated and determined to be ZSM-5 with a trace amount of an unidentified impurity.

Comparative Example B

Preparation of Theta-1 Using Sec-butylamine

In a 23 ml Teflon cup for a Parr 4745 reactor were added 2.88 grams of a 1.0N KOH solution, 4.9 grams of water, and 0.084 gram of Reheis F2000 hydrated alumina. After the solids dissolved, 2.17 grams of Nyacol 2040-NH$_4$ colloidal silica was added, followed by 0.29 ml of sec-butylamine and 0.04 gram of SSZ-32 seed crystals. After six days at 170° C. and 43 rpm, the resulting product was isolated and determined to be theta-1 (TON) with a trace amount of Cristobalite. The peaks in the XRD pattern for this product were very broad, indicative of very small crystallites.

Comparative Example C

Preparation of Theta-1 Using Sec-butylamine

The procedure described in Comparative Example B was repeated with the following changes: 0.056 gram of Reheis F2000 hydrated alumina was used (giving a starting SiO$_2$/Al$_2$O$_3$ mole ratio of 50 rather than 33) and 0.03 gram of theta-1 seed crystals was used. After four days at 170° C. and 43 rpm, the resulting product was isolated and determined by XRD to be theta-1 (TON) with a trace amount of Cristobalite. This XRD pattern for this product had much sharper peaks than that in Comparative Example B.

While a medium pore size zeolite was prepared in Comparative Examples A–C, they did not have the desired MTT (SSZ-32 or ZSM-23) structure.

What is claimed is:

1. A process for preparing a zeolite having, after calcination, the X-ray diffraction lines of Table I, said process comprising:
   (a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) at least one small, neutral amine having a total of four to about eight carbon atoms and being capable of forming said zeolite, said amine containing (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom;

(b) maintaining the aqueous solution under conditions sufficient to form crystals of the zeolite; and (c) recovering the crystals of the zeolite, wherein said process is conducted in the absence of a quaternary ammonium compound.

2. The process of claim 1 wherein said aqueous solution comprises, in terms of mole ratios, the following:

| $YO_2/W_2O_3$ | $\geq 15$ |
|---|---|
| $OH^-/YO_2$ | 0.10–0.40 |
| $Q/YO_2$ | 0.05–0.50 |
| $M_{2/n}/YO_2$ | 0.05–0.40 |
| $H_2O/YO_2$ | 10–70 | where Y is silicon, germanium or mixtures thereof; W is aluminum, iron, gallium, indium, titanium or mixtures thereof; Q is at least one small, neutral amine having a total of four to about eight carbon atoms and being capable of forming said zeolite, said amine containing (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom; M is an alkali metal, alkaline earth metal or mixtures thereof; and n is the valence of M.

3. The process of claim 2 wherein said aqueous solution comprises, in terms of mole ratios, the following:

| $YO_2/W_2O_3$ | 40 or more |
|---|---|
| $OH^-/YO_2$ | 0.15–0.30 |
| $Q/YO_2$ | 0.10–0.30 |
| $M_{2/n}/YO_2$ | 0.075–0.30 |
| $H_2O/YO_2$ | 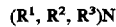 |

4. The process of claim 2 wherein Y is silicon and W is aluminum.

5. The process of claim 4 wherein the $YO_2/W_2O_3$ mole ratio is from about 20 to about 80.

6. The process of claim 4 wherein the $YO_2/W_2O_3$ mole ratio is 40 or more.

7. The process of claim 4 wherein the $YO_2/W_2O_3$ mole ratio is from about 40 to about 80.

8. The process of claim 1 wherein the small, neutral amine has the formula:

$(R^1, R^2, R^3)N$ wherein the amine contains only carbon, hydrogen and nitrogen atoms; $R^1$, $R^2$, and $R^3$ are H or $C_1$-$C_4$ alkyl groups, provided that at least one of $R^1$, $R^2$ and $R^3$ is alkyl; the amine contains a total of four to about eight carbon atoms; and the amine contains a tertiary nitrogen atom, or at least one tertiary carbon atom, or a nitrogen atom bonded directly to at least one secondary carbon atom.

9. The process of claim 1 wherein the small, neutral amine is selected from the group consisting of isobutylamine, diisobutylamine, and diisopropylamine.

10. The process of claim 4 wherein the amine is isobutylamine.

11. The process of claim 4 wherein the amine is diisobutylamine.

12. The process of claim 1 further comprising replacing the alkali metal cations, alkaline earth metal cations, or both of the recovered zeolite, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

13. The process of claim 12 wherein said replacing cation is hydrogen or a hydrogen precursor.

14. The process of claim 1 wherein said process is performed in the absence of any nitrogen-containing organic templating agent other than the small, neutral amine.

15. The process of claim 1 wherein the crystallization in step (b) is substantially complete in 72 hours or less.

16. A zeolite composition, as-synthesized and in the anhydrous state, having the X-ray diffraction lines of Table II and whose general formula, in terms of mole ratios, is as follows:

| $YO_2/W_2O_3$ | $\geq 15$ |
|---|---|
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is at least one small, neutral amine having a total of four to about eight carbon atoms and being capable of forming said zeolite, said amine containing (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom; M is an alkali metal cation, alkaline earth metal cation or mixtures thereof; and n is the valence of M, wherein said composition does not contain a quaternary ammonium compound.

17. The composition of claim 16 wherein Y is silicon and W is aluminum.

18. The composition of claim 17 wherein the $YO_2/W_2O_3$ mole ratio is from about 20 to about 80.

19. The composition of claim 17 wherein the $YO_2/W_2O_3$ mole ratio is 40 or more.

20. The composition of claim 17 wherein the $YO_2/W_2O_3$ mole ratio is from about 40 to about 80.

21. The composition of claim 16 wherein the small, neutral amine has the formula:

$(R^1, R^2, R^3)N$ wherein the amine contains only carbon, hydrogen and nitrogen atoms; $R^1$, $R^2$, and $R^3$ are H or $C_1$-$C_4$ alkyl groups, provided that at least one of $R^1$, $R^2$ and $R^3$ is alkyl; the amine contains a total of four to about eight carbon atoms; and the amine contains a tertiary nitrogen atom, or at least one tertiary carbon atom, or a nitrogen atom bonded directly to at least one secondary carbon atom.

22. The composition of claim 16 wherein the small, neutral amine is selected from the group consisting of isobutylamine, diisobutylamine, and diisopropylamine.

23. The composition of claim 17 wherein the amine is isobutylamine.

24. The composition of claim 17 wherein the amine is diisobutylamine.

25. The composition of claim 16 wherein said composition does not contain any nitrogen-containing organic templating agent other than the small, neutral amine.

26. A process for preparing a zeolite having, after calcination, the X-ray diffraction lines of Table I, said process comprising:
(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) trimethylamine, diisobutylamine or diisopropylamine;
(b) maintaining the aqueous solution under conditions sufficient to form crystals of the zeolite; and
(c) recovering the crystals of the zeolite.

27. The process of claim 26 wherein said process is conducted in the absence of a quaternary ammonium compound.

28. A zeolite composition, as-synthesized and in the anhydrous state, having the X-ray diffraction lines of Table II and whose general formula, in terms of mole ratios, is as follows:

| $YO_2/W_2O_3$ | $\geq 15$ |
|---|---|
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is trimethylamine, diisobutylamine or diisopropylamine; M is an alkali metal, alkaline earth metal or mixtures thereof; and n is the valence of M.

29. The composition of claim 28 wherein said composition does not contain a quaternary ammonium compound.

30. A process for preparing a zeolite having, after calcination, the X-ray diffraction lines of Table I, said process comprising:
(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) at least one small, neutral amine capable of forming said zeolite, said amine containing (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom;
(b) maintaining the aqueous solution under conditions sufficient to form crystals of the zeolite; and
(c) recovering the crystals of the zeolite,
wherein said process is conducted in the absence of a quaternary ammonium compound, and wherein the mole ratio of (a)(3) to (a)(2) is from about 20 to less than 40.

31. The process of claim 30 wherein said aqueous solution comprises, in terms of mole ratios, the following:

| $YO_2/W_2O_3$ | 20–less than 40 |
|---|---|
| $OH^-/YO_2$ | 0.10–0.40 |
| $Q/YO_2$ | 0.05–0.50 |
| $M_{2/n}/YO_2$ | 0.05–0.40 |
| $H_2O/YO_2$ | 10–70 | where Y is silicon, germanium or mixtures thereof; W is aluminum, iron, gallium, indium, titanium or mixtures thereof; Q is at least one small, neutral amine capable of forming said zeolite, said amine containing (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom; M is an alkali metal, alkaline earth metal or mixtures thereof; and n is the valence of M.

32. The process of claim 31 wherein said aqueous solution comprises, in terms of mole ratios, the following:

| $YO_2/W_2O_3$ | 20–less than 40 |
|---|---|
| $OH^-/YO_2$ | 0.15–0.30 |
| $Q/YO_2$ | 0.10–0.30 |
| $M_{2/n}/YO_2$ | 0.075–0.30 |
| $H_2O/YO_2$ | 25–50. |

33. The process of claim 31 wherein Y is silicon and W is aluminum.

34. The process of claim 33 wherein the zeolite has, after calcination and in the hydrogen form, a Constraint Index of 13 or greater.

35. The process of claim 30 wherein the small, neutral amine has the formula:

$$(R^1, R^2, R^3)N$$

wherein the amine contains only carbon, hydrogen and nitrogen atoms; $R^1$, $R^2$, and $R^3$ are H or $C_1$-$C_4$ alkyl groups, provided that at least one of $R^1$, $R^2$, and $R^3$ is alkyl; the amine contains a total of about three to about eight carbon atoms; and the amine contains a tertiary nitrogen atom, or at least one tertiary carbon atom, or a nitrogen atom bonded directly to at least one secondary carbon atom.

36. The process of claim 30 wherein the small, neutral amine is selected from the group consisting of isobutylamine, diisobutylamine, diisopropylamine and trimethylamine.

37. The process of claim 33 wherein the amine is isobutylamine.

38. The process of claim 33 wherein the amine is diisobutylamine.

39. The process of claim 30 further comprising replacing the alkali metal cations, alkaline earth metal cations, or both of the recovered zeolite, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

40. The process of claim 39 wherein said replacing cation is hydrogen or a hydrogen precursor.

41. The process of claim 30 wherein said process is performed in the absence of any nitrogen-containing organic templating agent other than the small, neutral amine.

42. The process of claim 30 wherein the crystallization in step (b) is substantially complete in 72 hours or less.

43. A zeolite composition, as-synthesized and in the anhydrous state, having the X-ray diffraction lines of Table II and whose general formula, in terms of mole ratios, is as follows:

| $YO_2/W_2O_3$ | 20–less than 40 |
|---|---|
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q is at least one small, neutral amine capable of forming said zeolite, said amine containing (a) only carbon, nitrogen and hydrogen atoms, (b) one primary, secondary or tertiary, but not quaternary, amino group, and (c) a tertiary nitrogen atom, or at least one tertiary carbon atom, or a nitrogen atom bonded directly to at least one secondary carbon atom; M is an alkali metal cation, alkaline earth metal cation or mixtures thereof; and n is the valence of M, wherein said composition does not contain a quaternary ammonium compound.

44. The composition of claim 43 wherein Y is silicon and W is aluminum.

45. The process of claim 44 wherein the zeolite has, after calcination and in the hydrogen form, a Constraint Index of 13 or greater.

46. The composition of claim 43 wherein the small, neutral amine has the formula:

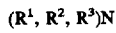

$(R^1, R^2, R^3)N$ wherein the amine contains only carbon, hydrogen and nitrogen atoms; $R^1$, $R^2$, and are H or $C_1$-$C_4$ alkyl groups, provided that at least one of $R^1$, $R^2$, and $R^3$ is alkyl; the amine contains a total of about three to about eight carbon atoms; and the amine contains a tertiary nitrogen atom, or at least one tertiary carbon atom, or a nitrogen atom bonded directly to at least one secondary carbon atom.

47. The composition of claim 43 wherein the small, neutral amine is selected from the group consisting of isobutylamine, diisobutylamine, diisopropylamine and trimethylamine.

48. The composition of claim 44 wherein the amine is isobutylamine.

49. The composition of claim 44 wherein the amine is diisobutylamine.

50. The composition of claim 43 wherein said composition does not contain any nitrogen-containing organic templating agent other than the small, neutral amine.

51. A process for preparing a zeolite having, after calcination, the X-ray diffraction lines of Table I, said process comprising:

(a) preparing an aqueous solution from (1) sources of an alkali metal oxide, alkaline earth metal oxide or mixtures thereof; (2) sources of an oxide selected from the oxides of aluminum, iron, gallium, indium, titanium, or mixtures thereof; (3) sources of an oxide selected from oxides of silicon, germanium or mixtures thereof; and (4) trimethylamine, diisobutylamine or diisopropylamine;

(b) maintaining the aqueous solution under conditions sufficient to form crystals of the zeolite; and (c) recovering the crystals of the zeolite, wherein the mole ratio of (a)(3) to (a)(2) is from about 20 to less than 40.

52. A zeolite composition, as-synthesized and in the anhydrous state, having the X-ray diffraction lines of Table II and whose general formula, in terms of mole ratios, is as follows:

| | |
|---|---|
| $YO_2/W_2O_3$ | 20–less than 40 |
| $Q/YO_2$ | 0.02–0.10 |
| $M_{2/n}/YO_2$ | 0.015–0.10 | wherein Y is silicon, germanium or a mixture thereof; W is aluminum, gallium, indium, iron, titanium, or mixtures thereof; Q comprises trimethylamine, diisobutylamine or diisopropylamine; M is an alkali metal cation, alkaline earth metal cation or mixtures thereof; and n is the valence of M.

* * * * *